(12) United States Patent
Lambert et al.

(10) Patent No.: US 7,016,806 B2
(45) Date of Patent: Mar. 21, 2006

(54) METHOD AND APPARATUS FOR EVENT MONITORING IN AN INFORMATION PROCESSING SYSTEM

(75) Inventors: Diane Lambert, Berkeley Heights, NJ (US); Chuanhai Liu, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 36 days.

(21) Appl. No.: 10/811,291

(22) Filed: Mar. 26, 2004

(65) Prior Publication Data

US 2004/0204906 A1    Oct. 14, 2004

Related U.S. Application Data

(60) Provisional application No. 60/459,177, filed on Mar. 31, 2003.

(51) Int. Cl.
*G06F 17/60* (2006.01)
(52) U.S. Cl. ...................... 702/181; 702/179
(58) Field of Classification Search ........ 702/179–181, 702/182, 183, 185, 176, 177, 187, 188, 189, 702/193, 186; 709/224; 706/917, 909, 908, 706/916; 455/423–425; 340/506, 511, 3.1, 340/825–836, 7, 58, 286.01, 286.02; 714/37, 714/39, 25, 47, 48
See application file for complete search history.

(56) References Cited

U.S. PATENT DOCUMENTS

| 5,555,191 A | * | 9/1996 | Hripcsak | 709/224 |
| 5,668,944 A | * | 9/1997 | Berry | 714/47 |
| 5,748,098 A | * | 5/1998 | Grace | 370/242 |
| 6,597,907 B1 | * | 7/2003 | Pruitt et al. | 455/423 |
| 2002/0019870 A1 | * | 2/2002 | Chirashnya et al. | 709/224 |
| 2003/0064720 A1 | * | 4/2003 | Valins et al. | 455/423 |

FOREIGN PATENT DOCUMENTS

WO    WO 02/21774 A1  *  3/2002

OTHER PUBLICATIONS

R.A. Maxion et al., "A Case Study of Ethernet Anomalies in a Distributed Computing Environment," IEEE Transactions on Reliability, vol. 39, No. 4, pp. 433-443, Oct. 1990.
F. Feather et al., "Fault Detection in an Ethernet Network Using Anomaly Signature Matching," Proceedings of SIGCOMM '93, Ithaca, New York, pp. 279-288, Sep. 1993.
M. Thottan et al., "Proactive Anomaly Detection Using Distributed Intelligent Agents," IEEE Network, pp. 21-27, Sep./Oct. 1998.

* cited by examiner

*Primary Examiner*—Hal Wachsman

(57) ABSTRACT

In an event monitor associated with an information processing system, data values corresponding to monitored events are processed using a set of parameters characterizing a reference distribution of the data values. From a given one of the data values a corresponding probability value is computed utilizing the set of parameters. A thresholding operation is then performed on the probability value, and alarm information is generated based on the result of the thresholding operation. The set of parameters are periodically updated to take into account one or more of the data values.

20 Claims, 2 Drawing Sheets

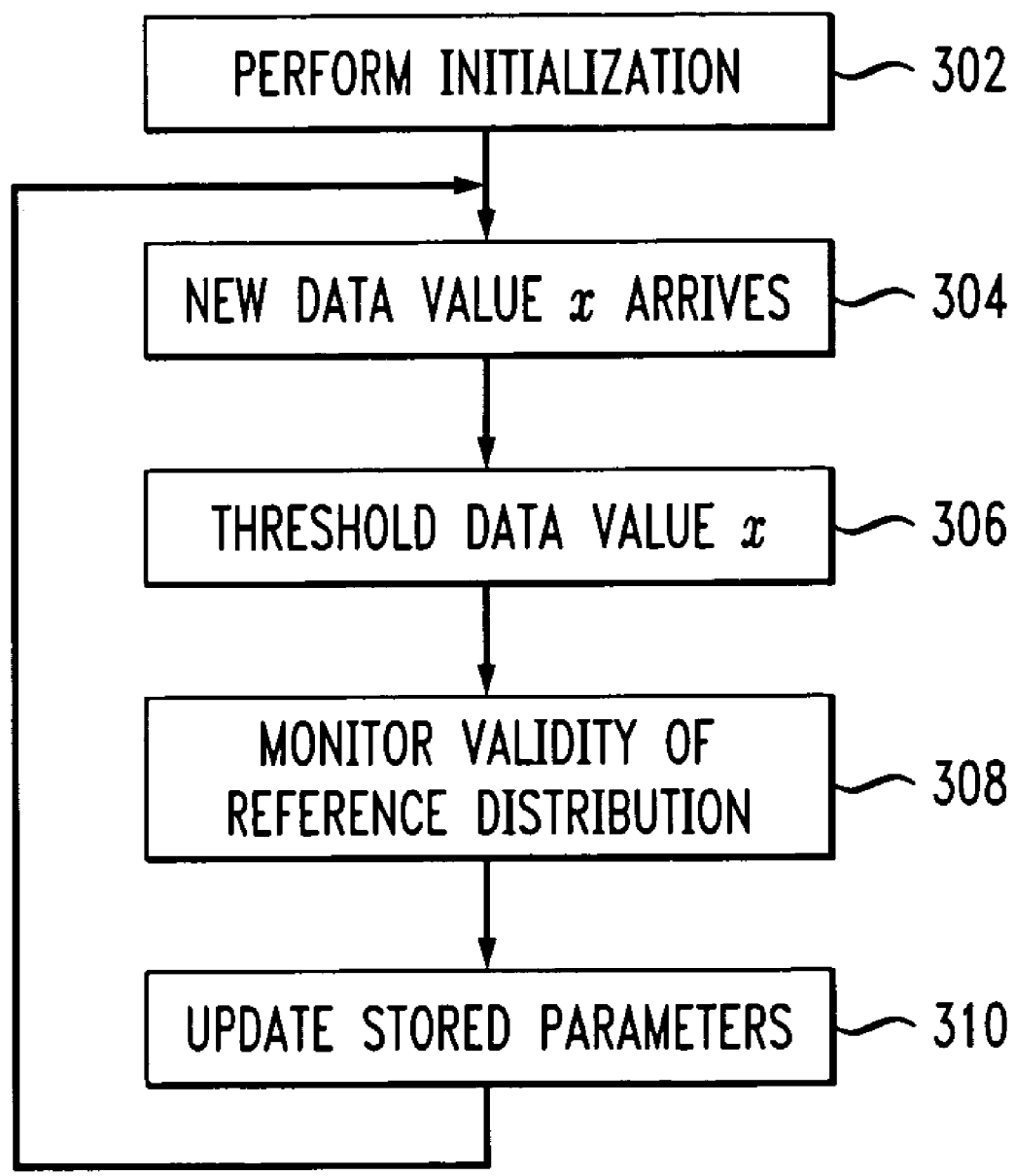

METHOD AND APPARATUS FOR EVENT MONITORING IN AN INFORMATION PROCESSING SYSTEM

This application claims the benefit of U.S. Provisional Application Ser. No. 60/459,177 filed on Mar. 31, 2003.

FIELD OF THE INVENTION

The invention relates generally to the monitoring of events in an information processing system, and more particularly to techniques for monitoring the output of an event counter or other similar device in such a system.

BACKGROUND OF THE INVENTION

In many information processing systems, it is important to monitor the occurrence of various different types of events. For example, in an operating system associated with a communications network, events that are monitored may include dropped or blocked calls. Such systems typically incorporate an event counter which maintains a count of the number of events occurring for each of the different types of events to be monitored. Based on the event counts, alarms may be generated to indicate problems or other conditions within the system. The event monitoring process is also commonly referred to, in certain information processing system contexts, as anomaly detection or fault detection.

Numerous techniques for event monitoring are known in the art. Examples of such techniques are described in R. A. Maxion et al., "A Case Study of Ethernet Anomalies in a Distributed Computing Environment," IEEE Transactions on Reliability, Vol. 39, No. 4, pp. 433–443, October 1990, F. Feather et al., "Fault Detection in an Ethernet Network Using Anomaly Signature Matching," Proceeding of SIGCOMM '93, Ithaca, N.Y., pp. 279–288, September 1993, and M. Thottan et al., "Proactive Anomaly Detection Using Distributed Intelligent Agents," IEEE Network, September/October 1998, pp. 21–27, all of which are incorporated by reference herein.

A significant problem with certain conventional event monitoring techniques is that such techniques are typically configured to "learn" patterns of counts over relatively long periods of time. This can lead to instability in situations in which the long-range pattern of the monitored events is itself changing on a timescale shorter than the learning time. Conventional techniques thus may not use event data from surrounding time periods to maximum advantage.

Also, conventional techniques often assume a normal distribution or other symmetric distribution for the event data being monitored, although such a distribution may not provide a sufficiently accurate estimate of the actual data distribution.

As a result of the above-described instability and data distribution assumptions, the conventional techniques can exhibit an excessive rate of false alarms.

Another problem with the conventional techniques is that such techniques generally do not provide a common scale with reference to which it is possible to combine and compare different types of observations having different baselines.

Yet another problem is that the conventional techniques are generally not configured to provide a sufficiently accurate indication of the severity of alarms.

It is therefore apparent that a need exists for improved event monitoring techniques which address one or more of the above-noted problems.

SUMMARY OF THE INVENTION

The present invention provides improved techniques for event monitoring in an information processing system.

In accordance with one aspect of the invention, an event monitor associated with an information processing system processes data values corresponding to monitored events, using a set of parameters characterizing a reference distribution of the data values. From a given one of the data values a corresponding probability value is computed utilizing the set of parameters. A thresholding operation is then performed on the probability value, and alarm information is generated based on the result of the thresholding operation. The set of parameters are periodically updated to take into account one or more of the data values.

In accordance with another aspect of the invention, the reference distribution comprises an asymmetric distribution, such as a negative binomial distribution, a lognormal distribution or a Poisson distribution.

In accordance with a further aspect of the invention, the probability value computed from a given data value x may comprise at least one of (i) an upper tail probability $P[\text{data value} \geq x]$; (ii) a lower tail probability $P[\text{data value} \leq x]$; and (iii) a minimum of $\{P[\text{data value} \geq x], P[\text{data value} \leq x]\}$. The probability value is computed using the set of parameters characterizing the reference distribution that applies at the time the given data value x is collected.

Advantageously, the event monitoring techniques of the present invention provide a number of significant improvements relative to the conventional techniques previously described. For example, the event monitoring techniques of the invention in an illustrative embodiment exhibit improved stability and a reduced rate of false alarms relative to the conventional techniques. In addition, the techniques of the invention can be configured to provide a common scale for combining and comparing different types of observations. Also, the techniques of the invention can be configured to provide a particularly accurate indication of alarm severity.

BRIEF DESCRIPTION OF THE DRAWINGS

FIG. 3 is a flow diagram illustrating an example event monitoring process implemented in the event monitoring system of FIG. 1.

DETAILED DESCRIPTION OF THE INVENTION

The present invention will be illustrated below in conjunction with an exemplary event monitoring system and an associated information processing system, the latter comprising a network-based communication system. It should be understood, however, that the invention is not limited to use with any particular type of system or system configuration, but is instead more generally applicable to any information processing application in which it is desirable to provide improved event monitoring.

The term "event" as used herein is intended to include any detectable activity, result, occurrence, or other condition associated with an information processing system.

Figure 1:
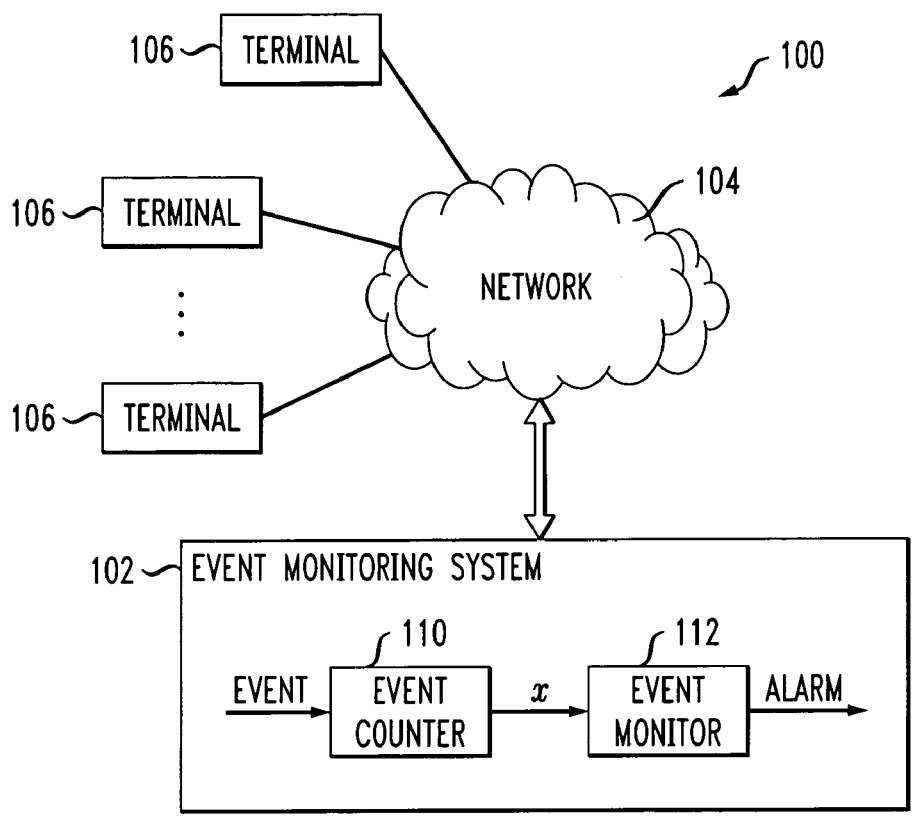
FIG. 1 shows an exemplary information processing system which includes an event monitoring system in accordance with an illustrative embodiment of the invention.

The description of the illustrative embodiments is divided into the following sections:

Section 1—General System Operation
Section 2—Detailed Event Monitoring Algorithm
Section 3—Initialization of the Event Monitoring Algorithm
Section 4—Example Event Monitoring System Features Section 1—General System Operation Referring initially to FIG. 1, an information processing system 100 comprising a network-based communication system includes an event monitoring system 102 coupled to a network 104. Also coupled to the network 104 are a plurality of terminals 106.

The network 104 may represent a wide area data communication network such as the Internet, a local area network (LAN), a public switched telephone network (PSTN), a wireless network, a satellite communication network, as well as portions or combinations of these or other types of networks.

The terminals 106 may represent wired or wireless telephones, workstations, portable or desktop computers, personal digital assistants (PDAs), etc. in any combination.

The event monitoring system 102 as shown includes an event counter 110 and an event monitor 112. The event counter 110 receives as input event information from the network 104, and generates data values, each denoted x herein, which may represent counts of events of a particular type. A given data value x will generally have a timestamp or other timing-related information associated therewith indicating, for example, the observation time.

As will be described in greater detail below with reference to the flow diagram of FIG. 3, the event monitor 112 implements an algorithm in accordance with one aspect of the invention which monitors the data values generated by the event counter 110 and generates alarm information based on the results of its monitoring operations.

Although the event monitoring system 102 is shown in FIG. 1 as including an event counter separate from the event monitor, this is by way of example only. In other embodiments, the functions associated with the event counter may be incorporated in whole or in part into the event monitor, or the event counter may be eliminated altogether and data values corresponding to monitored events delivered directly from the network to the event monitor. The invention thus does not require the use of an event counter.

One example of a possible application of the system 100 is in an application in which one or more of the terminals 106 are associated with digital subscriber line (DSL) connections of the network 104. In such an application, the event monitoring system 102 may be implemented in or otherwise associated with a network operating system of the network 104, and may be used to monitor the DSL connections for events. Conventional aspects of such a network operating system are well known in the art and are therefore not described in detail herein. Of course, the invention is not restricted to use in this particular application.

Advantageously, the present invention provides event monitoring techniques, illustratively implemented in the event monitor 112, that are configurable to overcome one or more of the above-described problems associated with conventional techniques. For example, the techniques of the invention generally exhibit improved stability and a reduced rate of false alarms relative to the conventional techniques.

Figure 2:
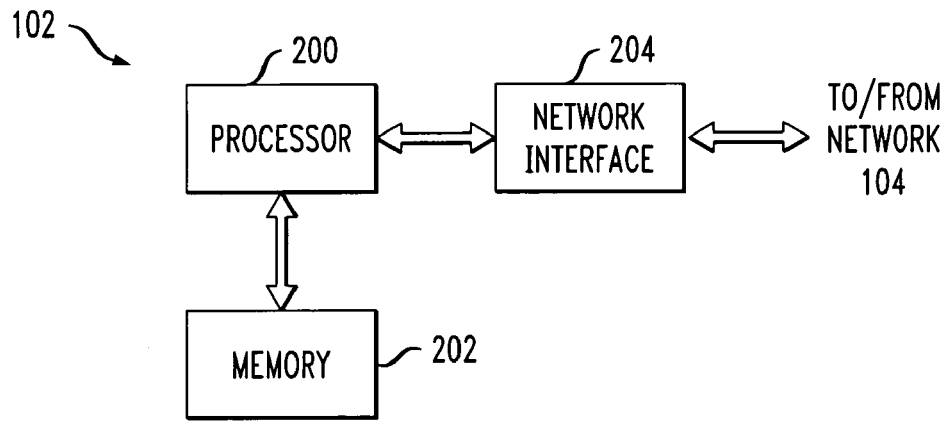
FIG. 2 is a block diagram showing one possible implementation of the event monitoring system of FIG. 1.

FIG. 2 shows one possible implementation of the event monitoring system 102 coupled to network 104. The system 102 in this embodiment includes a processor 200, a memory 202 and a network interface 204.

The processor 200 may represent a microprocessor, a central processing unit (CPU), an application-specific integrated circuit (ASIC) or other digital data processor, as well as various portions or combinations of these and other devices.

The memory 202 may represent one or more storage devices, which may include, by way of example, electronic memory, magnetic or optical disk-based memory, etc.

The memory 202 and network interface 204, although shown as separate elements in the figure, may be at least partially incorporated within the processor 200.

The event monitoring techniques of the present invention may be implemented at least in part in the form of one or more software programs stored in memory 202 and executed by the processor 200 of the event processing system 102.

It should be noted that the particular arrangements shown in FIGS. 1 and 2 are considerably simplified for purposes of illustration, and may include additional elements of a conventional type that are not explicitly described herein.

FIG. 3 shows a flow diagram 300 illustrating generally the steps in an example event monitoring algorithm in accordance with the invention. A more detailed example of an algorithm of this type will be described in Section 2 below.

In step 302 of the FIG. 3 process, the event monitoring algorithm is initialized. An exemplary initialization process suitable for use with the detailed algorithm of Section 2 will be described in conjunction with Section 3 below.

Steps 304, 306, 308 an 310 are repeated for each data value x generated by the event counter 110 of FIG. 1.

In step 304, a new data value x arrives in the event monitor 112 as supplied by the event counter 110.

A thresholding process is then applied to the data value x and appropriate alarm information is generated. The term "alarm information" as used herein is intended to include any user-perceptible indicator or other type of information which is indicative of a particular condition associated with monitored event.

The validity of the reference distribution used in the thresholding process is monitored in step 308, and any needed adjustment to corresponding stored system parameters is made in step 310.

Each of the steps 304, 306, 308 and 310 will be described in greater detail in Section 2 below.

It is to be appreciated that the particular steps shown, and their ordering, is by way of illustrative example only. Thus, the invention may be implemented in numerous alternative ways which will be apparent to one skilled in the art.

Section 2—Detailed Event Monitoring Algorithm

A more detailed example of an event monitoring algorithm of the type shown in FIG. 3 will now be described.

In this particular example, three timescales are used. These timescales are the measurement timescale at which data are collected and thresholded, the parameter timescale at which updated means and variances are stored, and the cycle timescale which covers the time represented by one complete set of parameters. For convenience, we use a minute for the measurement timescale, an hour for the parameter timescale, and a day for the cycle timescale in this example, although other timing values and timescales can be used in implementing the invention.

Therefore, in this example algorithm, a data value is thresholded every minute, two stored parameters (e.g., a mean estimate and a variance estimate) are updated every hour, and each day has the same set of hourly parameters. If each day of week has a different set of hourly parameters, then the cycle would be a week instead of a day and it would have 168 sets of hourly parameters instead of 24 sets of hourly parameters.

The only restriction on these timescales, in the context of the example algorithm, is that the cycle timescale should be an integer multiple of the parameter timescale, and the parameter timescale should be an integer multiple of the measurement scale. It should be noted that this restriction, and other restrictions and assumptions made herein in describing the illustrative embodiments, should not be viewed as requirements of the invention.

The thresholding process of the example algorithm uses probability values, also referred to herein as p-values, to identify "suspicious" data values, that is, data values that may require generation of an alarm by the event monitoring system 102.

A p-value is the probability of obtaining a data value at least as extreme as the one observed. Small p-values are associated with extreme data values, so small p-values indicate suspicious observations. The smaller the p-value, the more extreme the data value.

If only large data values would be considered suspicious, then the p-value associated with a data value x is defined by the upper tail probability P[data value$\geq$x], which is computed using a reference distribution that applies at the time x is collected.

If small data values are suspicious, then the p-value associated with x is defined by P[data value$\leq$x], which is a lower tail probability.

If either large or small probabilities are suspicious, then an upper tail p-value is of interest if x is above the median and a lower tail p-value is of interest if x is at or below the median, so the p-value is defined by minimum {P[data value$\geq$x], P[data value$\leq$x]}.

Thresholding p-values rather than data values is advantageous in that p-values are typically more convenient for monitoring duration, severity and spread of an event for a service or meta-service. P-values are always on a 0–1 scale and have the same uniform distribution on [0, 1] when there are no adverse events, so they can be combined easily. In contrast, data values have different reference distributions if there are time of day or day of week patterns even if there are no adverse events, so they are difficult to combine in a principled way.

The particular steps of the example event monitoring algorithm to be described in this section are generally carried out when a new data value x arrives after initialization is complete. Completion of initialization typically occurs at the end of a first cycle. Initialization may take longer than one cycle if nearly all the data are missing, but in that case monitoring should probably be deferred until data collection is improved.

One aspect of the invention relates to the type of reference distribution used to characterized the event data values. As noted above, conventional techniques often assume a normal distribution or other symmetric distribution, and do not take maximum advantage of event data from surrounding time periods. The present invention in the illustrative embodiments preferably utilizes an asymmetric distribution, such as a negative binomial distribution, a lognormal distribution or a Poisson distribution, rather than a symmetric distribution.

Steps 1 through 4 of the ten-step example algorithm described below relate to processing operations associated with receiving and thresholding the data value x, and thus correspond generally to steps 304 and 306 of FIG. 3.

Step 5 (which is optional) monitors the validity of the reference distribution, and thus corresponds generally to step 308 of FIG. 3. The reference herein to any particular step or operation as being "optional" in the context of a given illustrative example should not be construed as an indication that any other steps or operations of that example or other examples are requirements of the invention.

Steps 6 through 10 update the stored parameters, and thus correspond generally to step 310 of FIG. 3.

It should be noted that an additional smoothing step may be included at the end of the ten-step algorithm in order to smooth the hour parameters at the end of a cycle. However, the smoothing that is incorporated into Step 3 in the example algorithm will be sufficient for many practical applications.

Initialization will be described in Section 3 below, using a modified version of the ten-step algorithm of Section 2. Note that there is a distinction between initialization and training. Initialization generally continues until there is a full set of stored parameters, which is usually one cycle. Training is usually longer (e.g., two cycles of training are often sufficient) because it continues until the underlying patterns in the parameters have been learned.

The ten steps of the example event monitoring algorithm are listed and described below. Again, it is to be appreciated that the particular steps as well as their order of performance is exemplary only. Numerous alternative processing algorithms will be apparent to those skilled in the art given the teachings contained herein.

1. Transform

Some choices of reference distribution may require the data to be converted to a different scale. For example, if a lognormal distribution is used, then x should be transformed to log(1+x). This step is not needed for a Poisson or negative binomial reference distribution.

2. Index

From the timestamp of x, compute the minute m, hour h, and day d that x was collected. The minute, hour and day indices are preferably re-set to zero (not one) at the start of every minute, hour, and day, respectively.

3. Interpolate

A mean $\mu_{h,m}$ and variance $V_{h,m}$ for minute m of hour h is computed using quadratic interpolation with the interpolating coefficients that were computed at the end of the previous hour (see Step 10 below). The interpolation coefficients depend on the stored parameters for this hour, the previous hour and the next hour, so this step also smooths the stored parameters across hours. The interpolation is unbiased in the sense that the mean and variance computed from all the interpolated minutes within any one of the three hours equal the stored mean and variance for that hour.

The interpolation proceeds as follows. Suppose x occurs at minute m and there are M minutes in an hour. Define u=m/M and t=(m+1)/M. Then the interpolated minute mean is $$\mu_{h,m}=A_\mu*(t^2+u*t+u^2)+B_\mu*(u+t)+C_\mu$$

where the coefficients $A_\mu$, $B_\mu$, and $C_\mu$ are the pre-computed interpolation coefficients from Step 10. The interpolated minute variance $V_{h,m}$ is computed in exactly the same way, but different interpolating coefficients $A_V$, $B_V$, $C_V$, also computed in Step 10, are used.

4. P-value Given the data value x, compute both the upper tail p-value $p_U$=P[data value$\geq$x] and the lower tail p-value $p_L$=P[data value$\leq$x] under the reference distribution that has the minute parameters computed in Step 3. The upper and lower tail p-values are used in validation, even if p-values in only one direction are thresholded. Both p-values are also used to compute duration, severity, and spread of events for services and meta-services.

It should be noted that negative binomial p-values for large means and variances and extreme values of x are defined in terms of a beta function, and so should be handled accordingly.

5. Validate (Not Used during Training, Optional After Training)

After training, this step monitors the validity of the reference distribution. It does not affect thresholding, but the information that it collects can be used to check whether the reference distribution is appropriate.

The validation process involves building a histogram of p-values, which is a table of counts of p-values falling in a set of equal-width intervals that cover [0, 1]. For example, the 100 intervals of width 0.01 that start with [0, 0.01) and end with [0.99, 1.0] cover [0, 1]. The number of intervals is a user-specified parameter, but 100 is a reasonable number to use. The histogram is updated with each new data value by determining which interval contains the p-value associated with x and incrementing the count of that interval by 1. If the reference distribution is continuous and appropriate for the data values, then the count for each interval of the histogram should be approximately the same.

P-values for discrete data values are not continuous, however, especially for small means and variances, so the validation histogram is not nearly flat for small means and variances. The problem is that some data values may have large probabilities P[data value=x], and this discreteness can cause the validation histogram to depart from uniformity, falsely suggesting that the reference distribution is inadequate. To avoid that impression, the p-values should be corrected so they will behave in a more continuous fashion. An added advantage to correcting for continuity is that the histograms for continuous upper tail and continuous lower tail p-values are mirror images of each other, so it is sufficient to compute just the histogram for continuity-corrected lower tail p-values. The continuity correction can always be used, as it does no harm and is not burdensome to compute.

To compute the continuity-corrected lower p-value, first compute $p_x = p_L + p_U - 1$, which is the probability of observing exactly x under the reference distribution. Then take a random draw Z from the uniform distribution on [0, 1] and compute the continuity corrected lower p-value as $p_{cont} = p_L - Z \cdot p_x$.

The validation histogram should be re-started every cycle or whenever there is a concern that the thresholding is not performing well.

6. Outliers (Not Used during Training)

If x is an outlier (e.g., beyond the 0.9999 quantile) and training is complete, then a modified x is used to update the hourly mean and variance. Outliers are ignored during training because the hour parameters are not yet known well enough to understand what should be considered as an outlier. Outliers could be pulled back to a threshold, such as the 0.9999 quantile of the reference distribution. But censoring leads to underestimating the variance over time, which then leads to too many small p-values and false alarms. We avoid underestimating the variance by replacing an upper tail outlier with a random draw from the reference distribution F conditioned to be above the 0.75 quantile of F (so upper tail outliers are replaced with upper tail data values). A lower tail outlier is replaced by a random draw from F, now conditioned to be smaller than the 0.25 quantile of F. Note that outliers in both tails should be replaced by random draws to protect the estimates of the mean and variance, even if only large x suggest adverse events. Missing values are never considered outliers. The modified x is used in the remaining steps.

7. Missing Data

A random draw from the reference distribution F with minute parameters from Step 3 is used in place of the missing data value to update parameters in Step 8.

8. Minute Parameters

Update the mean of the reference distribution for the minute m, corresponding to x by taking a weighted average of x and the mean $\mu_{h,m}$ for minute m and hour h that was computed in Step 3. The weight on a new data value can be specified. A suitable example starting weight is 0.15, although other values could also be used. The user-specified weight may be automatically increased during training, so the mean and variance patterns can be learned more quickly.

During cycle c, the interpolated mean $\mu_{h,m}$ from Step 3 is updated by computing $$\mu_{h,m}^{new} = (1 - w_c)\mu_{h,m} + w_c X, \text{ where } w_c = w + \frac{1-w}{1+c}.$$

The variance of the reference distribution corresponding to x is updated similarly. In cycle c, the interpolated variance $V_{h,m}$ from Step 3 is updated by $V_{h,m}^{new} = (1-w_c) \cdot V_{h,m} + w_c \cdot (X-\mu_{h,m})^2$.

The minute parameters can be used to check whether the mean and variance patterns are adequate for thresholding. Over a cycle, for example, the average, or sample mean, of the data values should be nearly equal to the average of the minute means. The minute variances can also be used as a debugging diagnostic in simulations with a flat mean that does not vary with time of day or day of week. In that kind of simulation, the sample variance of the data values should be nearly equal to the average minute variance, which should be larger than the variance specified by the user for the simulation. The reference distribution is used to predict the next observation. In order to predict well, the reference distribution has to take into account the variance of the underlying (e.g., negative binomial) distribution, the uncertainty about the parameter values of that distribution, and the day-to-day variation in the parameter values. The total variability that needs to be used for prediction, then, is typically larger than the variability specified by the user for the underlying distribution.

9. Hour Parameters

The parameters $\mu_h$ and $V_h$ for hour h of day d are updated at each minute during the hour so that the data values collected during the hour do not have to be stored. At the end of the hour, the updated hour mean $\mu_h^{new}$ is a weighted average of the old hour mean and the average of all the minute means $\mu_{h,m}^{new}$ collected during the hour. The formula for updating the mean hour parameter incrementally at minute m is $\mu_h^{new} = (m \cdot \mu_h + \mu_{h,m}^{new})/(m+1)$.

The hour variance is updated at minute m according to $V_h^{new} = (m \cdot V_h + V_{h,m}^{new})/(m+1)$.

10. Store Parameters (Only at the End of the Hour)

Coefficients for quadratic interpolation in the next hour are computed. Take $S_{-1}$ to be the stored mean for this hour, $S_0$ to be the stored mean for the next hour, and $S_{+1}$ to be the stored mean for two hours ahead. Then $$A_\mu = (S_{-1} - 2*S_0 + S_{+1})/6$$

$$B_\mu = (S_0 - S_{-1})/2$$

$$C_\mu = (2*S_{-1} + 5*S_0 - S_{+1})/6.$$

The interpolation coefficients $A_V$, $B_V$, and $C_V$ for the variance are computed similarly by replacing stored means with stored variances. Finally, the parameters for the hour are stored.

As indicated previously, the event monitoring system 102 can be configured to include software for implementing the example algorithm described in this section.

Section 3—Initialization of the Event Monitoring Algorithm

The example event monitoring algorithm described in the previous section is modified as indicated below for use during initialization of the hourly parameters. Initialization begins in the first hour during which (i) the sample mean and variance can be evaluated and (ii) the sample variance is positive (so not all data values are equal). Initialization generally continues until there is a complete set of stored parameters.

Initialization uses three additional parameters $T_\mu$, $T_V$, and N because interpolation generally cannot be used during initialization. These parameters are initialized to zero and updated with each new data value x during initialization.

1. Transform

Same as in Section 2.

2. Index

Same as in Section 2.

3. Interpolation (Skipped if N=0)

This step computes the minute parameters for the reference distribution used to threshold x. For $N \geq 1$, define $\mu_{h,m} = T_\mu/N$ and $V_{h,m} = T_V/N$. For example, during the first hour $\mu_{h,m}$ is the sample mean of the data values collected so far, not including the current data value, and $V_{h,m}$ is the sample variance of the data values collected so far, not including the current data value.

4. P-Value (Skipped if $V_{h,m}=0$.)

Compute both the upper tail p-value $p_U = P[\text{data value} \geq x]$ and the lower tail p-value $p_L = P[\text{data value} \leq x]$ under the reference distribution with the minute parameters $\mu_{h,m}$ and $V_{h,m}$ from Step 3.

5. Validate (Not used during Initialization)

6. Outliers (Not Used during Initialization)

The hour patterns are not known well enough during initialization to know which data values are aberrant.

7. Missing Data (Skip if $V_{h,m}=0$)

If the data value for this minute is missing, replace it with a random draw from the reference distribution with that mean and variance. The random draw is used as x in the following steps.

8. Minute Parameters (Not Used during Initialization)

9. Hour Parameters

The three parameters are updated as follows.

$$T_\mu^{new} = T_\mu + x$$

$$T_V^{new} = T_V + N*(x - \mu_{h,m})^2/(N+1)$$

$$N^{new} = N+1$$

10. Store Parameters (Only at the End of the Hour)

At the end of the hour, compute the hour parameters $\mu_h = T_\mu/N$ and $V_h = T_V/N$. Re-initialize $N = \max(1, 0.25N)$, $T_\mu = N*\mu_h$, and $T_V = N*T_V$. This re-initialization smooths the hour parameters from one hour to the next during initialization.

At the end of the last hour of the initialization cycle, the interpolation coefficients are computed as in Step 10 of Section 2.

Again, the event monitoring system 102 can be configured to include software for implementing the above-described initialization process.

Section 4—Example Event Monitoring System Features

The event monitoring system 102 in accordance with an illustrative embodiment may be configured to permit a system user to enter parameters such as the measurement timescale, parameter timescale, cycle timescale, and the length of the training period. Suitable defaults for the measurement, parameter and cycle timescales in the detailed example described above are five minutes, one hour, and one day, respectively, each specified in numbers of seconds.

The event monitoring system 102 in accordance with the invention may also be provided with one or more of the following capabilities.

1. Plots

In displaying information generated by the event monitoring system, a quantile plot option may be provided that draws a set of panels, one for each day of monitoring. Each panel may show the data values, the estimated median and the thresholding quantiles that the user has specified (suitable defaults are the 0.0001 and 0.9999 quantiles.) The panels in which training is ongoing may be labeled. The full set of panels is useful for understanding large-scale patterns (e.g., stretches of missing values or outliers). The display may be configured such that clicking on a panel of the plot magnifies the panel so that the data values can be distinguished more easily. Zooming in is better for judging how the data values are behaving around the estimated mean, for example.

A histogram option may be provided that displays the histogram of continuity-corrected p-values, which can be used to check the validity of the reference distribution (and the correctness of the event monitoring code during debugging.)

2. Analysis

A analysis capability may be provided that can take a file of data values and times, and a reference distribution such as the negative binomial distribution, and output the estimated parameters for each data value and its lower and upper p-values. Missing values may be permitted in the input file. Several data sets from other monitoring applications may be included. Poisson, negative binomial and lognormal reference distributions may be supported, so that the effect of different choices of reference families on thresholding can be judged in the context of different data sets.

3. Simulation

A simulation capability may be provided such that Poisson, negative binomial and other types of data can be simulated. The mean is either flat or sinusoidal (to represent periodic behavior). The mean can be inflated by arbitrary factors over arbitrary, user-specified periods of time to simulate adverse events. The variance of the Poisson, by definition, is equal to its mean, so a user-specified variance is ignored for the Poisson distribution. The variance of the negative binomial is input as a multiplicative factor that is applied to the mean (e.g, the variance may be twice the mean.) Simulating data from one family (e.g., negative binomial) and using reference distributions from another family (e.g., Poisson) shows the effect of using the wrong reference distribution for thresholding under those conditions.

It is also possible to simulate data values from a specified reference distribution (such as the negative binomial) with parameters set equal to the estimated parameters output from an analysis run. For example, negative binomial data with means and variances computed from one of the supplied real data sets can be simulated and thresholded using either Poisson, negative binomial or lognormal reference distributions. This allows simulating more realistic mean and variance patterns.

4. Alarm Severity

A capability for measuring severity of alarm information may be provided. Among other advantages, including a measure of alarm severity in the system gives a better sense of how well the thresholding is performing.

In one possible implementation, suspicious p-values may be highlighted in red or other suitable color on display plots. Other suitable user-perceptible indicia may be used to communicate the presence of an alarm.

As a more particular example, all p-values that cross a specified threshold can be considered suspicious and colored red by setting a severity weight equal to one.

However, a single p-value that barely crosses the threshold may not justify an alarm. With a 0.0001 threshold on a p-value and 10 second sampling, the expected time until a p-value crosses a threshold is less than 30 hours under normal conditions. Isolated, minor threshold crossings can be avoided as follows.

First, note that p-values of 0.001 and 0.0001 are nearly the same on the [0,1] scale, but they are a factor of ten different. This suggests that ratios of p-values or differences of logs of p-values are more important than differences of raw p-values. In fact, it is even more convenient to use the so-called logit transformation $$L(p) = \log\left(\frac{1-p}{p}\right)$$

which is symmetric around zero, corresponding to a p-value of 0.5. We take logits of continuity corrected p-values, as described in Step 4 of Section 2. If the severity measure before the new data value is S and the new data value has a logit transformed p-value of L, then the updated severity measure is $$S^{new}=(1-w)*S+w*L,$$

where the severity weight w can be specified by the user. A suitable default is 0.75, although other values can be used. A severity weight w=1 implies that all past p-values are ignored so single outliers may be colored red. For any weight w, the severity measure should be about zero if the data values follow the reference distribution. The severity measure takes on larger positive values for smaller p-values, and it can become large if there is an isolated but very extreme data value or if there is a run of several near-extreme data values. It takes on large negative values for large p-values. Of course, this particular alarm severity measure is exemplary only, and other severity measures can be provided using the techniques of the invention.

An alarm severity measure of the type described above can be configured to indicate the severity of alarm conditions based on multiple-mode error comprising at least error duration and error spread. In this context, severity is measured by both duration, e.g., the number of successive observation intervals in which counts remain above a threshold, and spread, e.g., the number of error types affected. How far the counts are above threshold can also be taken into account, as indicated previously.

As mentioned above, the event monitoring techniques of the invention generally exhibit improved stability and a reduced rate of false alarms relative to conventional techniques. Other advantages include providing a common scale with reference to which it is possible to combine and compare different types of observations having different baselines. For example, as described above, measures based on logarithms of p-values can be combined across different types of observations to provide greater insight into the monitored events. This is attributable at least in part to the fact that p-values are always on a 0–1 scale and have the same uniform distribution on [0, 1] when there are no adverse events, so they can be combined easily. Another advantage is that the invention permits the generation of an accurate indication of alarm severity.

It should be understood that the above-described embodiments of the invention are intended to be illustrative only, and the invention may be implemented in numerous alternative embodiments. For example, alternative embodiments may include different system or processing elements, algorithm steps, timescales and timing values, etc. than those explicitly shown. These and numerous other alternative embodiments within the scope of the following claims will be apparent to those skilled in the art.

We claim:

1. A method for monitoring data values in an event monitoring system, using a set of parameters characterizing a reference distribution of the data values, the method comprising the steps of:

computing from a given one of the data values a corresponding probability value, utilizing the set of parameters characterizing the reference distribution;

performing a thresholding operation on the probability value;

generating alarm information based on the result of the thresholding operation; and periodically updating the set of parameters to take into account one or more of the data values;

wherein the probability value corresponding to the given one of the data values is the probability of obtaining a data value at least as extreme as that given data value.

2. The method of claim 1 wherein the event monitoring system comprises an event counter which generates the data values and an event monitor which processes the data values to generate the alarm information.

3. The method of claim 1 wherein the set of parameters comprises at least a mean and a variance for the reference distribution of the data values.

4. The method of claim 3 wherein the reference distribution comprises an asymmetric distribution.

5. The method of claim 4 wherein the asymmetric distribution comprises one of a negative binomial distribution, a lognormal distribution and a Poisson distribution.

6. The method of claim 1 wherein the data values are collected and thresholded in accordance with a measurement timescale, the set of parameters are updated in accordance with a parameter timescale longer in duration than the measurement timescale, and a complete set of the parameters is determinable in accordance with a cycle timescale longer in duration than the parameter timescale.

7. The method of claim 6 wherein the measurement timescale comprises approximately one minute, the parameter timescale comprises approximately one hour and the cycle timescale comprises approximately one day.

8. The method of claim 1 wherein the probability value computed from a given data value x comprises at least one of:
  (i) an upper tail probability P[data value≧x];
  (ii) a lower tail probability P[data value≦x]; and
  (iii) a minimum of {P[data value≧x], P[data value≦x]};
  wherein the probability value is computed using the set of parameters characterizing the reference distribution that applies at the time the given data value x is collected.

9. The method of claim 1 wherein the set of parameters characterizing the reference distribution is determined at least in part by interpolating coefficients over multiple parameter timescales.

10. The method of claim 1 further comprising the step of periodically monitoring validity of the reference distribution.

11. The method of claim 10 wherein the validity of the reference distribution is monitored by generating a histogram of a plurality of probability values and determining if counts associated with a plurality of intervals of the histogram are each approximately the same.

12. The method of claim 11 wherein the probability values utilized in generating the histogram are corrected for continuity by:
  computing the probability of observing data value x under the reference distribution as $p_x = p_L + p_U - 1$, where $p_L$ and $p_U$ denote respective lower and upper tail probabilities associated with data value x under the reference distribution;
  taking a random draw Z from a uniform distribution on [0, 1]; and
  computing a continuity corrected probability value as $p_{cont} = p_L - Z^* p_x$.

13. The method of claim 1 further comprising the step of determining if the given data value is an outlier, and if so modifying the given data value as follows:
  replacing an upper tail outlier with a random draw from the reference distribution conditioned to be within a specified upper portion of the distribution, such that the upper tail outlier is replaced with another upper tail data value; and
  replacing a lower tail outlier with a random draw from the reference distribution conditioned to be within a specified lower portion of the distribution, such that the lower tail outlier is replaced with another lower tail data value.

14. The method of claim 1 wherein the step of updating the set of parameters characterizing the reference distribution further comprises updating a given one of the parameters as a weighted average of corresponding parameter values determined over a designated timescale.

15. The method of claim 1 further including the step of initializing the set of parameters characterizing the reference distribution.

16. The method of claim 1 wherein the alarm information further comprises an alarm severity measure that indicates the severity of alarm conditions based on multiple-mode error comprising at least error duration and error spread.

17. The method of claim 1 wherein the alarm information further comprises an alarm severity measure generated at least in part utilizing at least one of a ratio of multiple probability values and a difference of logarithms of probability values.

18. The method of claim 1 wherein the alarm information further comprises an alarm severity measure S, and the given data value has a logit transformation L, for a corresponding probability value p, given by:

$$L(p) = \log\left(\frac{1-p}{p}\right),$$

and further wherein the alarm severity measure is updated as follows:

$$S^{new} = (1-w)^* S + w^* L,$$

where w denotes a severity weight.

19. An apparatus for monitoring data values in an event monitoring system, using a set of parameters characterizing a reference distribution of the data values, the apparatus comprising:
  a memory for storing the set of parameters; and
  a processor coupled to the memory and operative to control operations associated with the monitoring of the data values, the operations including:
  computing from a given one of the data values a corresponding probability value, utilizing the set of parameters characterizing the reference distribution;
  performing a thresholding operation on the probability value;
  generating alarm information based on the result of the thresholding operation; and
  periodically updating the set of parameters to take into account one or more of the data values;
  wherein the probability value corresponding to the given one of the data values is the probability of obtaining a data value at least as extreme as that given data value.

20. An article of manufacture comprising a machine-readable storage medium for storing one or more programs for use in monitoring data values in an event monitoring system, using a set of parameters characterizing a reference distribution of the data values, wherein the one or more programs when executed implement the steps of:
  computing from a given one of the data values a corresponding probability value, utilizing the set of parameters characterizing the reference distribution;
  performing a thresholding operation on the probability value;
  generating alarm information based on the result of the thresholding operation; and
  periodically updating the set of parameters to take into account one or more of the data values;
  wherein the probability value corresponding to the given one of the data values is the probability of obtaining a data value at least as extreme as that given data value.

* * * * *